(12) United States Patent
Chanda et al.

(10) Patent No.: US 10,801,957 B2
(45) Date of Patent: Oct. 13, 2020

(54) MOLECULAR CHIRALITY DETECTION TECHNIQUE USING HYBRID PLASMONIC SUBSTRATES

(71) Applicant: University of Central Florida Research Foundation, Inc., Orlando, FL (US)

(72) Inventors: Debashis Chanda, Oviedo, FL (US); Abraham Vázquez-Guardado, Orlando, FL (US)

(73) Assignee: UNIVERSITY OF CENTRAL FLORIDA RESEARCH FOUNDATION, INC., Orlando, FL (US)

( * ) Notice: Subject to any disclaimer, the term of this patent is extended or adjusted under 35 U.S.C. 154(b) by 0 days.

(21) Appl. No.: 16/566,087

(22) Filed: Sep. 10, 2019

(65) Prior Publication Data

US 2020/0080937 A1 Mar. 12, 2020

Related U.S. Application Data

(60) Provisional application No. 62/729,073, filed on Sep. 10, 2018.

(51) Int. Cl.
*G01N 21/552* (2014.01)
*G01N 21/21* (2006.01)
*G01N 21/35* (2014.01)

(52) U.S. Cl.
CPC .......... *G01N 21/554* (2013.01); *G01N 21/21* (2013.01); *G01N 21/35* (2013.01); *G01N 2021/3595* (2013.01)

(58) Field of Classification Search
CPC ...... G01N 21/554; G01N 21/21; G01N 21/35; G01N 2021/3595
See application file for complete search history.

(56) References Cited

U.S. PATENT DOCUMENTS

2008/0278728 A1* 11/2008 Tetz ..................... G01N 21/554
356/445

* cited by examiner

*Primary Examiner* — Jamil Ahmed
(74) *Attorney, Agent, or Firm* — Preti Flaherty Beliveau & Pachios LLP

(57) ABSTRACT

A method for molecular chirality detection is described. The method includes providing a substrate defining an array of hole-disks, each hole-disk coupled with an asymmetric optical cavity. Each asymmetric optical cavity having a back reflector separating a plasmonic pattern by an appropriate selection of thickness. The substrate is illuminated to simultaneously excite two degenerate localized surface plasmon modes producing a strong chiral near-field. The method may also include generating a characterization of chiral molecules on the substrate based on the strong chiral near-field. Substrates and detectors for molecular chirality detection are also described.

20 Claims, 10 Drawing Sheets

MOLECULAR CHIRALITY DETECTION TECHNIQUE USING HYBRID PLASMONIC SUBSTRATES

STATEMENT REGARDING FEDERALLY SPONSORED RESEARCH OR DEVELOPMENT

N/A

BACKGROUND OF THE INVENTION

Various embodiments relate generally to chiral detection systems, methods, devices and computer programs and, more specifically, relate to chirality detection using hybrid plasmonic substrates.

This section is intended to provide a background or context. The description may include concepts that may be pursued, but have not necessarily been previously conceived or pursued. Unless indicated otherwise, what is described in this section is not deemed prior art to the description and claims and is not admitted to be prior art by inclusion in this section.

Chirality is a ubiquitous property of life, found at many levels of biological systems from left-handed amino acids to right-handed glucose. It gives rise to the inherent chirality to DNAs, proteins, and more, which remained hitherto unexplored due to unavailability of precise characterization techniques. These chiral biomolecules can be present in both handed symmetries called enantiomers with undistinguishable physical properties, such as density, molecular weight or electronic and vibrational transitions frequencies making them almost impossible to differentiate with common spectroscopic techniques. However, it is the interaction with other chiral elements that an enantiomer can be differentiated. Circularly polarized light (CPL), either right polarized (RCP) or left polarized (LCP), has a well-defined chirality. When a certain enantiomer interacts with its light enantiomer counterpart there is a difference in the light extinction rate compared to the opposite light enantiomer: a technique known as circular dichroism (CD). Furthermore, present CD spectroscopy is severely limited by weak differential absorption cross-section of molecules due to mismatch between light wavelength and molecular dimensions. In addition, the CD signal strength depends on light's chirality, which is fundamentally capped.

Chirality sensors transform the way chiral molecules are detected in conventional systems. Pharmacological and toxicological characterization of enantiomers plays a crucial role in the pharmaceutical drug industry and FDA approval process. Furthermore, it is of great medical interest to study protein conformational changes as protein misfolding profiles as the precursor of many diseases, for example Alzheimer's disease and cataracts, which are caused by β-amyloids and crystallins, respectively, both having gone through previous protein misfolding and aggregation processes.

The conventional systems fail to enable the detection of molecular chirality on a single substrate, fail to allow the detection in the picomolar range, and require long detection times.

BRIEF SUMMARY OF THE INVENTION

The below summary is merely representative and non-limiting.

The above problems are overcome, and other advantages may be realized, by the use of the embodiments.

In a first aspect, an embodiment provides a method for molecular chirality detection. The method includes providing a substrate defining an array of hole-disks, each hole-disk coupled with an asymmetric optical cavity, each asymmetric optical cavity having a back reflector separating a plasmonic pattern by an appropriate selection of thickness. The method also includes illuminating the substrate to simultaneously excite two degenerate localized surface plasmon modes and producing a strong chiral near-field. The method may further include generating a characterization of chiral molecules on the substrate based on the strong chiral near-field.

In another aspect, an embodiment provides a chirality detector, the detector comprising a substrate, a back reflector disposed on the substrate; and an array of hole-disks in the substrate. Each hole-disk is coupled with an asymmetric optical cavity. Each asymmetric optical cavity is defined by the back reflector separating a plasmonic pattern by a given thickness.

BRIEF DESCRIPTION OF THE DRAWINGS

Aspects of the described embodiments are more evident in the following description, when read in conjunction with the attached Figures.

DETAILED DESCRIPTION OF THE INVENTION

Figure 1A:
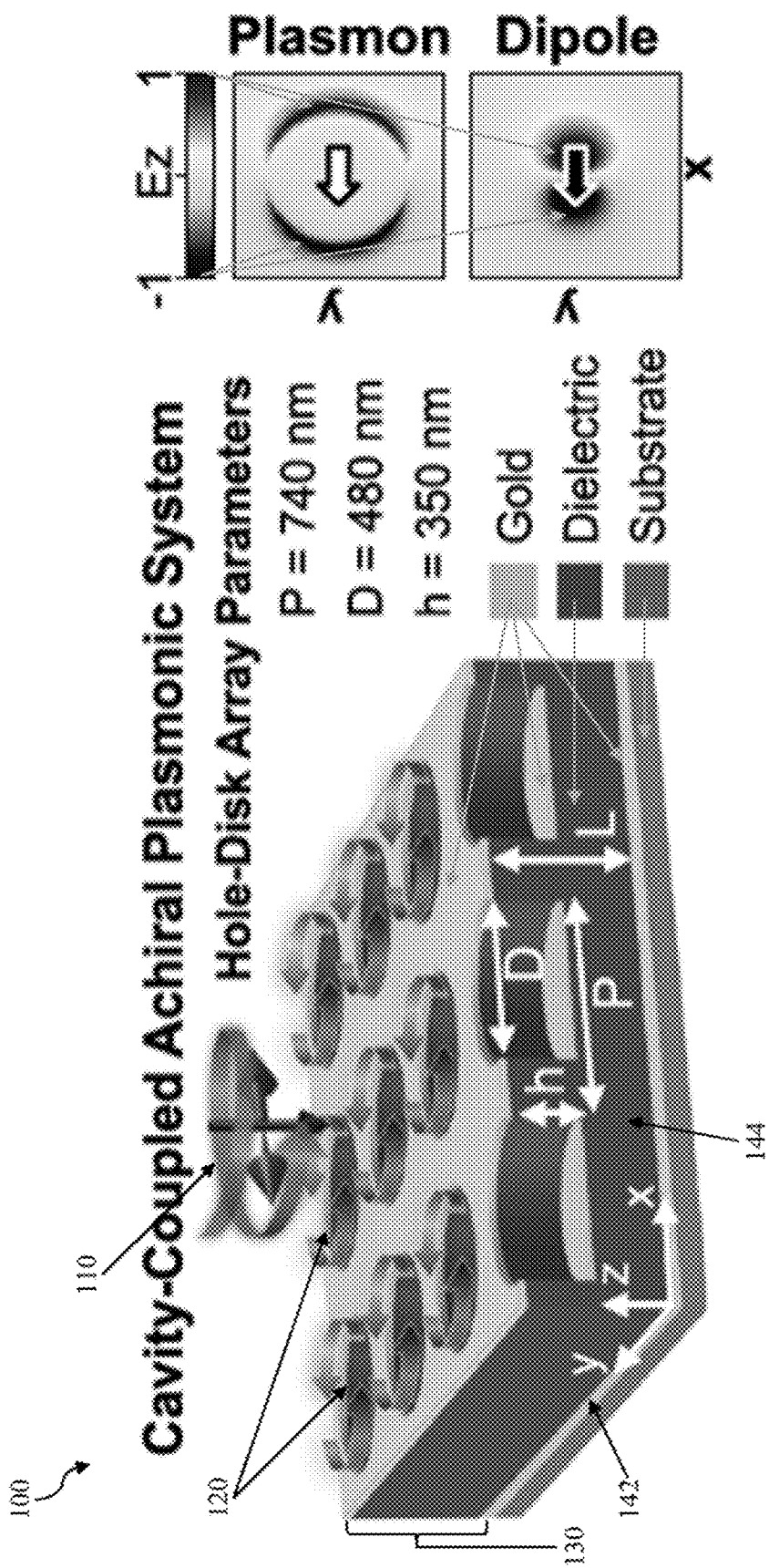
FIG. 1A shows an achiral plasmonic system which supports rotating dipolar resonance in accordance with an embodiment on the left side, and an out-of-plane electric field comparing the LSPR and dipole modes on the right side.

This patent application claims priority from U.S. Provisional Patent Application No. 62/729,073, filed Sep. 10, 2019, the disclosure of which is incorporated by reference herein in its entirety.

Various embodiments use a route of superchiral near-field generation based on geometrically achiral systems supporting degenerate and spatially superimposed plasmonic modes. Such systems generate a single-handed chiral near-field with simultaneous zero far-field circular dichroism— the key combination of features. The phenomenon is elucidated with a rotating dipole model, which predicts a uniform single-handed chiral near-field that flips handedness solely by reversing the handedness of the source. This property allows detection of pure background free molecular chirality through near-field light-matter interaction, which is demonstrated in the precise identification of both handedness of a chiral molecule on a single substrate with about four orders of magnitude enhancement in detection sensitivity compared to its conventional volumetric counterpart.

These molecular chirality detection techniques allow pharmaceutical companies to perform the fast identification of their enantiomeric concentration of synthesized drugs to comply with FDA approval levels. It also allows the pharmaceutical or biological fields in the real-time monitoring of protein folding aiding the research and development of various pharmaceuticals characterization toolkits.

Various embodiments provide a single optical element thin-film chirality sensor when fabricated based on a low cost, large area nanoprinting technique that immensely benefits drug design and DNA/protein identification at the level of a few picogram of chiral molecule. This is in contrast to the milligram level detection limit of present CD spectroscopy. With the integration of microfluidic systems, protein folding and misfolding could be studied in real-time opening a venue for certain disease treatments.

In one non-limiting embodiment, the detection technique is based on surface enhanced circular dichroism and employs an engineered nano-surface to detect molecular chirality efficiently. Previous attempts based on plasmonic systems, without any experimental demonstration, where based on chiral plasmonic surfaces in contrast to this approach where only one achiral plasmonic substrate is enough. In those previous attempts, the chiral plasmonic systems inscribe a structural circular dichroism signal in the measurement which disrupts the weak molecular circular dichroism signal from the molecule. Therefore, when performing chirality detection both surface plasmonic enantiomers are used to retrieve such information. In this approach, a single substrate is used, which is able to induce chiral light-matter interaction very efficiently and perform the molecular chirality identification at low molecular levels with high accuracy. Furthermore, the proposed chirality sensor can be fabricated based on the nanoimprinting technique which allows rapid, high quality, low cost and mass fabrication capabilities.

Previous attempts to enhance chiral light-matter interactions were based on macroscopic interferometric superchiral light generation and chiral plasmonic structures. Nevertheless, they failed to address somewhat mutually exclusive requirements of weak CD detection of trace chiral elements. While the former lacks field enhancement, the latter induces strong structural far-field CD; therefore, the small CD signal coming from chiral molecules gets completely overshadowed by structural chirality or immersed in the noise level. Various embodiments provide a technique to generate and control, at will, the chiral near-field that can be in direct contact and fully accessible to the target analyte. The cavity-coupled achiral plasmonic metasurface overcomes previous attempts in enhancing the chiral light-matter interaction. The metasurface, being fully symmetric, has no geometrical chirality, hence no far-field CD from the substrate, which ensures almost no background noise from the substrate. It creates strong near-fields on the upper surface exposed to the analyte allowing stronger interaction with the analyte. The near-fields have almost 100% either RCP or LCP-like chiral fields depending on the excitation condition on the same achiral geometry—maximizing the chiral signal from the target analyte. The chiral plasmonic resonance is straightforwardly tuned by the cavity; hence a wide range of chiral molecules with varied absorption bands can be probed based on the same nanostructure, which is not possible in any conventional techniques.

As noted above, chirality is a ubiquitous property of life. Present in two enantiomeric configurations: left (sinister, s-) and right (dexter, d-), chiral molecules have indistinguishable physical properties and degenerate transition frequencies that do not allow their straightforward identification with common spectroscopic techniques. However, it is the interaction with other enantiomers that is the key to differentiate their intrinsic chiral configuration. Circularly polarized light (CPL), right polarized (RCP), or left polarized (LCP), is a classical example of an electromagnetic enantiomer pair that allows chiral light-matter interaction in circular dichroism (CD) spectroscopies. However, free propagating CPL has an upper chiral density bound that fundamentally limits chiral light-matter interactions.

Previous efforts have been made to produce light fields with chiral density larger than CPL, called superchiral fields, using specially engineered fields. One approach is based on macroscopic interference produced by two counter-propagating CPL beams with opposite handedness to enhance the absorption rate of chiral molecules but at the cost of reducing electric field intensity. Other alternative methods employ photonic and plasmonic surfaces to produce superchiral near-fields. Nevertheless, these systems produce a strong far-field CD signal that potentially overshadows weak molecular CD signals and low chiral near-field purity, e.g., similar contribution from both near-field handedness in the same volume. These mutually exclusive requirements were not accomplished in previous attempts based on macroscopic interference, geometrically chiral, or achiral plasmonic substrates.

One, non-limiting embodiment, shown in FIG. 1A, provides a single-handed superchiral near-field generation on an achiral cavity-coupled plasmonic system 100 with simultaneous zero CD signal in the far-field. The system supports two degenerate and superimposed orthogonal plasmonic modes that are simultaneously excited with CPL 110 with the corresponding phase difference between each other resulting in an effective rotating resonance. The coherent interaction between the localized surface plasmon and the cavity enhances the otherwise weak uncoupled-plasmonic resonance and produces the superchiral near-field. The physical phenomenon that allows this exceptional effect is elucidated with an achiral oscillating point dipole model, which accurately agrees with the finite difference time domain (FDTD) predicted plasmonic modal behavior. The spatiotemporal distribution of the rotating resonance, and not the field distribution per se, is the true mechanism of this unique superchiral near-field generation. Various embodiments can identify vibrational circular dichroism (VCD), where both chiral enantiomers are accurately identified at very low concentration ~3.8 nL volume with a 3 wt % molecular filling fraction on a single achiral plasmonic substrate.

Figure 1B:
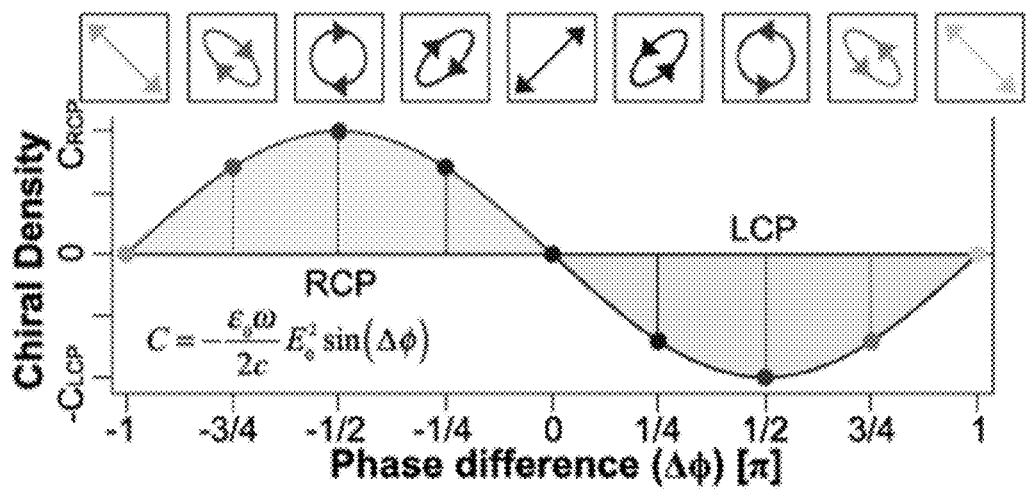
FIG. 1B shows the chiral density of a plane wave with arbitrary polarization state propagating along the −z direction.

FIG. 1A shows the achiral plasmonic system 100, comprised of a cavity-coupled hole-disk array 120, which supports rotating dipolar resonance when excited with CPL 110. The out-of-plane electric field is shown to compare the LSPR and dipole modes. FIG. 1B shows the chiral density of a plane wave with arbitrary polarization state propagating along the −z direction (into the paper).

The spatial distribution of the electromagnetic chiral density of an arbitrary complex field, whether in the near-field or far-field, related to the spin angular momentum and helicity of light, is given by $$C(r) = -\frac{1}{2}\varepsilon_0 \omega \mathrm{Im}(E^* \cdot B) \tag{1}$$

where E and B are the complex time varying electric and magnetic field vectors, r is the position vector, and $\varepsilon_0$ is the vacuum permittivity. As stated by Eq. (1), it is the collinear configuration with nonzero phase difference between the electric and magnetic fields that produces a finite value of chiral density. For a backward propagating plane wave, $E=(1/\sqrt{2})E_0(\hat{x}+e^{i\Delta\phi}\hat{y})e^{i(\omega t - k \cdot r)}$, $B=(k \times E)/\omega$ and $k=-k\hat{z}$, where k is the free space wave vector, $E_0$ the electric field magnitude, and $\Delta\phi$ the phase between the orthogonal field vectors, the chiral density becomes $C(r)=-(\varepsilon_0 \omega/2c)E_0^2 \sin(\Delta\phi)$, where c is the speed of light in vacuum. It is clearly evident that a linearly polarized (LP) plane wave ($\Delta\phi=0$) does not carry chiral density since the transverse E and B fields are always orthogonal; see FIG. 1B. This is not the scenario for CPL whose chiral density is $C_{CPL}=\pm(\varepsilon_0\omega/2c) E_0^2 : C_{LCP}<0$ ($\Delta\phi=+\pi/2$) and $C_{RCP}>0$ ($\Delta\phi=-\pi/2$). Any arbitrary polarization state renders lower chiral densities than CPL, yet retaining the corresponding helicity determined by the phase difference as observed in FIG. 1B.

The achiral plasmonic substrate system 100 is illustrated in FIG. 1A, which is comprised of a nanostructured square array of gold hole disks 142 (P=740 nm, D=480 nm, hole-disk separation h=350 nm, and film thickness of 30 nm) coupled with an asymmetric Fabry-Perot cavity 130. The cavity 130 is formed with a gold back reflector 142 separating the plasmonic pattern 120 with cavity thickness (L) determined by the dielectric film 144.

Figure 2A:
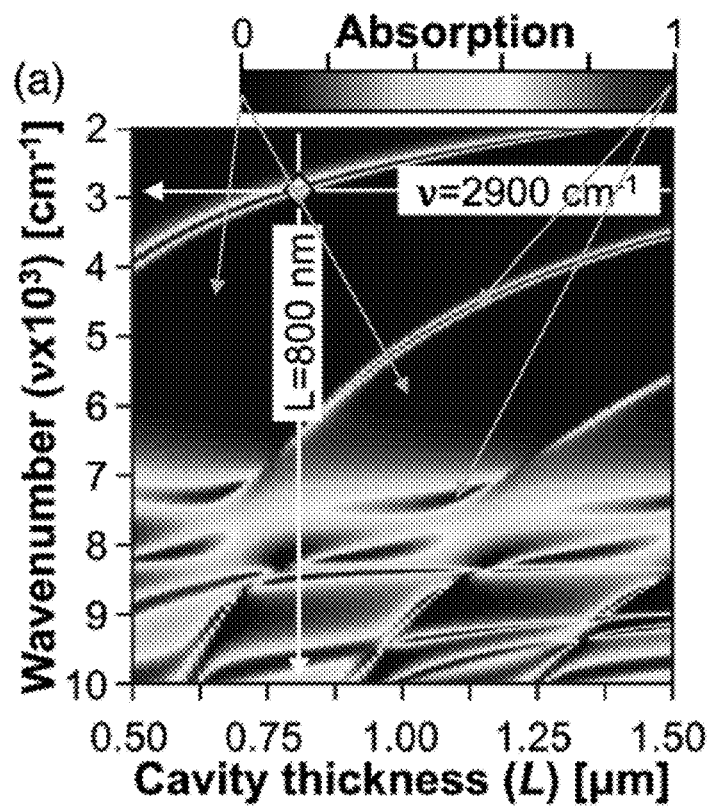
FIG. 2A illustrates a cavity absorption dispersion for normal excitation with LP light.

In order to understand the electro-magnetic properties of this coupled system finite difference time domain (FDTD) simulations were performed. FIG. 2A shows the absorption dispersion for LP excitation. The first interaction occurs around 9700-7000 cm$^{-1}$ where the hole-disk system 100 supports natural localized surface plasmon (LSP) modes induced solely by the geometrical parameters of the array 120. In this band, hybrid resonance modes are observed as absorption frequency splitting around the LSP absorption band due to the coherent interaction between cavity and plasmonic modes.

Figure 2B:
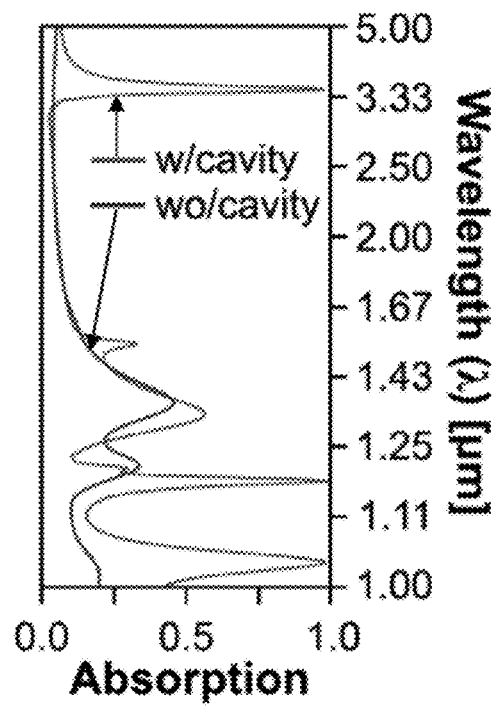
FIG. 2B illustrates an absorption spectra comparison for a cavity thickness of L=800 nm and a cavity-uncoupled hole disk.

FIG. 2A shows cavity absorption dispersion for normal excitation with LP light. FIG. 2B shows an absorption spectra comparison for a cavity thickness of L=800 nm and a cavity-uncoupled hole disk.

A second, yet more interesting, interaction occurs when the cavity resonates away from the natural LSP band of the top plasmonic pattern. The cavity resonance depends strictly on the propagation phase imposed by the cavity ($n_d kL$), where $n_d$ is the refractive index of the dielectric spacer. Although adding a cavity enhances the LSP mode at the natural LSP band compared to its uncoupled counter-part, the excitation of LSP modes at lower energies is possible when placing a polarizable element inside the cavity as observed in the absorption spectra in FIG. 2B.

At the fundamental cavity resonant mode, the electric field antinodes are located around the optical center of the cavity where the disk is placed, while strong magnetic field antinodes are located at the edges of the cavity, e.g., the back reflector and the top hole array. As a result, the cavity selectively polarizes the hole-disk system inducing electric or magnetic LSP modes (e-LSP or m-LSP) on the disk or hole, respectively, as observed in FIG. 3.

Figure 3:
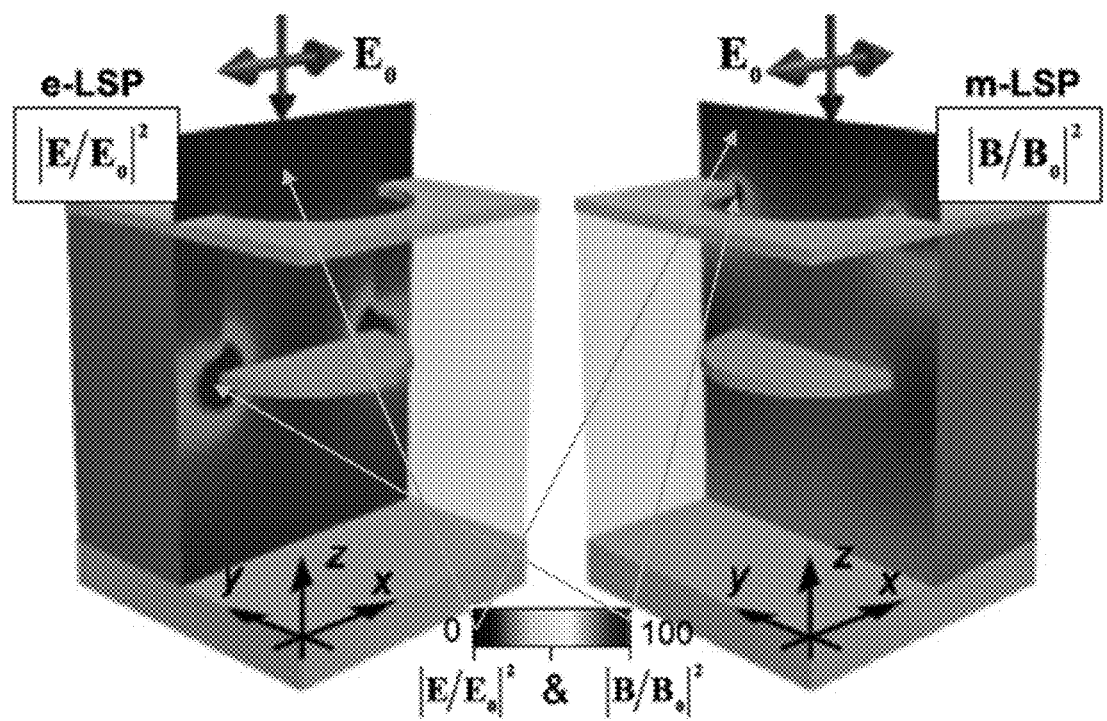
FIG. 3 shows electric (on the left) and magnetic (on the right) intensity cross sections at the center of one unit cell for L=800 nm and $v=2900$ cm$^{-1}$.

FIG. 3 demonstrates electric (left) and magnetic (right) intensity cross section at the center of one unit cell for L=800 nm and v=2900 cm$^{-1}$.

This symmetric achiral system supports two degenerate LSP resonances along each of the lattice axes. Upon illumination with CPL both LSP modes are excited simultaneously with a phase difference imposed by the excitation source. Both electric and magnetic field intensity distributions are exactly the same when excited either by LCP or RCP, without any dissymmetry in the absorption spectrum; see FIG. 4C. However, the chiral near-field density generated by this system is remarkably different.

Figure 4A:
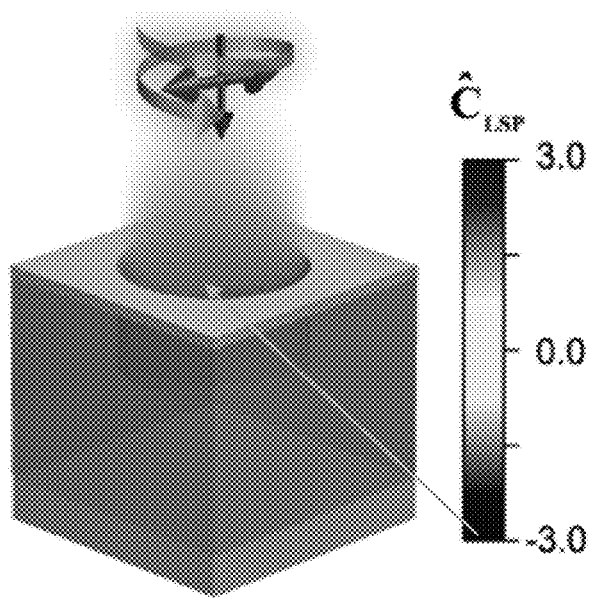
FIG. 4A demonstrates a free space normalized LSP chiral near-field density distribution for LCP excitations, represented in one array unit cell.
Figure 4B:
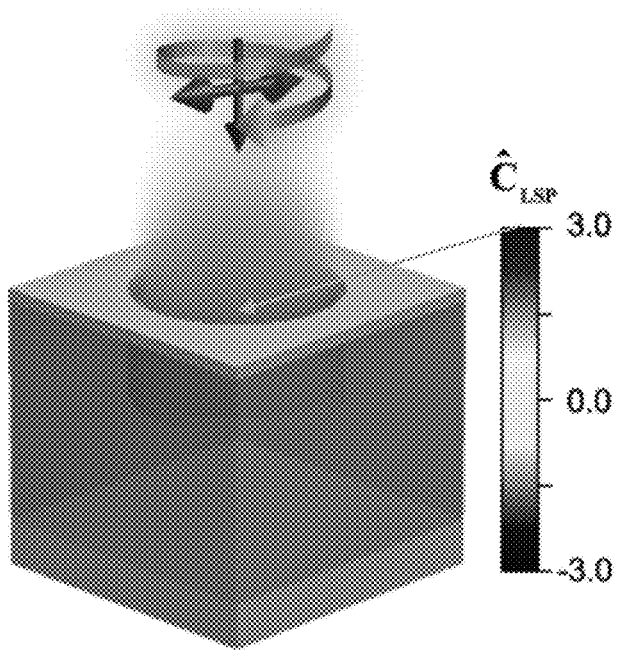
FIG. 4B demonstrates a free space normalized LSP chiral near-field density distribution for RCP excitations, represented in one array unit cell.
Figure 4C:
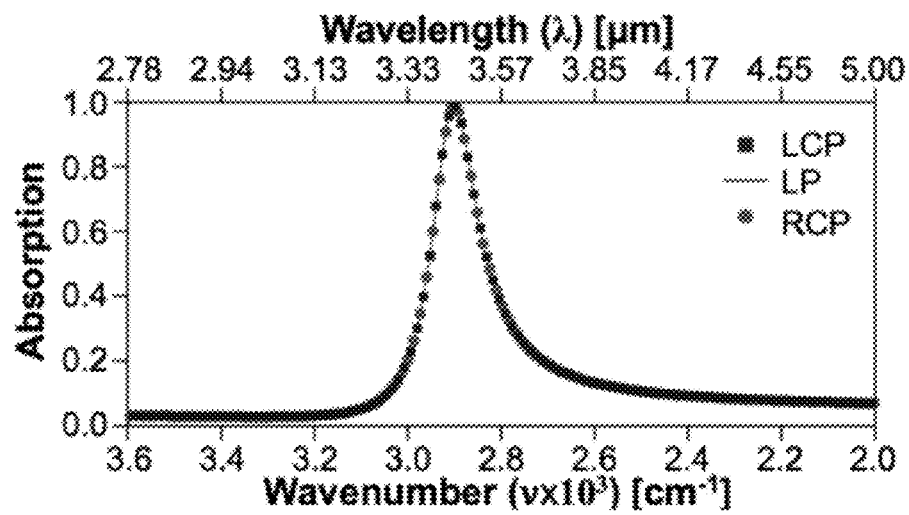
FIG. 4C demonstrates simulated absorption spectra of the 2D achiral plasmonic substrate for LCP, LP, and RCP.
Figure 4D:
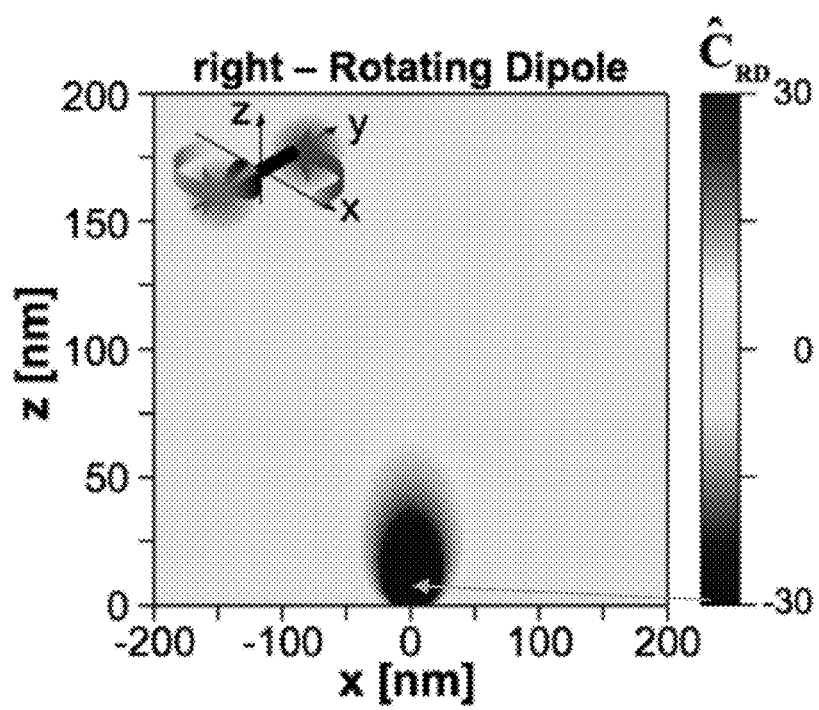
FIG. 4D demonstrates a chiral near-field cross section for right rotating dipole.
Figure 4E:
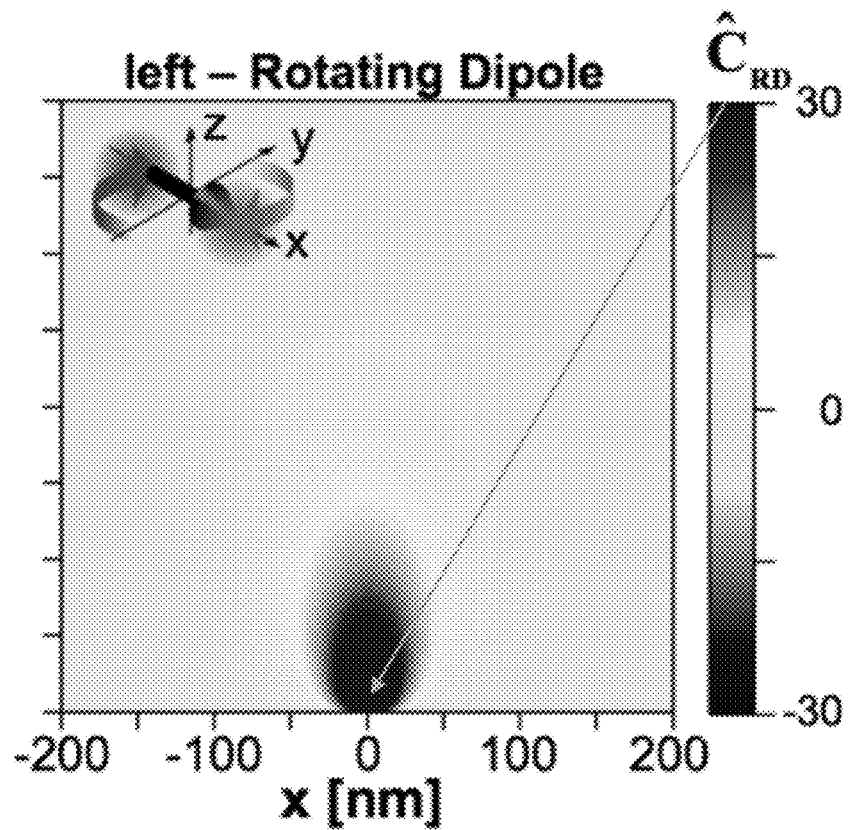
FIG. 4E demonstrates a chiral near-field cross section for left rotating dipole.

As observed in FIGS. 4A and 4B, the near-field chiral density has the same handedness as the incident light which fully reverses when flipping the incident CPL excitation on the same geometry. Furthermore, volume integration in the upper half-space of the unit cell at resonance reveals 99.96% of the near-field has CPL-like chiral density and only 0.04% has the opposite helicity across the entire LSP band. This is not the case for LP where the chiral near-field volume average is zero as both helicities are present.

The aforementioned property is phenomenologically modeled using an electromagnetic rotating dipole (RD) model. The plasmonic system, when excited with CPL, produces a spatiotemporal rotating motion along the optical axis making the rotating dipole model suitable for the present context. The RD oriented in the xy plane at z=0 is $\tilde{p}=p_0\hat{p}e^{-i\omega t}=(1/\sqrt{2})p_0(\hat{x}+e^{i\Delta\phi}\hat{y})e^{-i\omega t}$, where $p_0$ is the dipole moment magnitude and $\omega$ is the angular frequency. A right (left) RD corresponds to a phase difference of $+(-)\pi/2$. The corresponding electric and magnetic fields associated with this dipole are $E_{RD}(r)=(1/4\pi\varepsilon_0)(e^{ikr}/r^3) \{k^2r^2(n\times\hat{p})\times n+[3n(n\cdot\hat{p})-\tilde{p}](1-ikr)\}$, and $B_{RD}(r)=\xi(c\mu_0 k^2/4\pi)(e^{ikr}/r)(n\times\hat{p})[1-(1/ikr)]$. Here n is the unit vector and r is the position vector with magnitude r. In addition, an enhancement factor $\xi$ is introduced in the magnetic field. This empirical variable quantifies the common misbalance in the magnetic to electric near-field enhancement factors on plasmonic systems at resonance.

Solving Eq. (1) for this set of vector fields obtains the spatial dependence of the RD chiral near-field density is $$C_{RD}(r) = C_{RD0}\sin(\Delta\phi)\frac{z}{r^3}, \tag{2}$$

were $C_{RD0}$ is a scale factor given by the dipole electromagnetic parameters. From this simple result three important observations can be made: for a fixed rotation direction $\Delta\phi$ the chiral near-field in the entire upper stratum, $z>0$, has same chirality sign that fully reverses uniquely by flipping the rotation direction of the dipole $\Delta\phi$; the chirality of a linear dipole is zero; and the chiral field is strictly confined in the near-field around the dipole oscillation center.

Finally, the total chiral near-field is obtained by including the total field, e.g., $E_T=E_{CPL}+E_{RD}$ and $B_T=B_{CPL}+B_{RD}$. The contribution to the total chiral density, $C_T=C_{CPL}+C_{ECPL\text{-}BRD}+C_{ERD\text{-}BCPL}+C_{RD}$, originates from four sources: the incident field ($C_{CPL}$) and RD ($C_{RD}$), as previously described, and the interaction from the incident electric or magnetic field with the dipole-generated magnetic or electric field ($C_{ECPL\text{-}BRD}/C_{ERD\text{-}BCPL}$). Solving the electromagnetic chirality for these two extra terms the total chirality becomes $$C_T(r) = C_{CPL}\left\{1 + \frac{\kappa}{r^3}\left[\xi z + \frac{1}{2r}(r^2 - 3z^2) - \xi k^2 \kappa z\right]\right\}, \quad (3)$$

where $\kappa=\alpha_0 k/4\pi\varepsilon_0$ is the normalized dipole polarizability and $\alpha_0$ is the dipole polarizability.

Figure 4F:
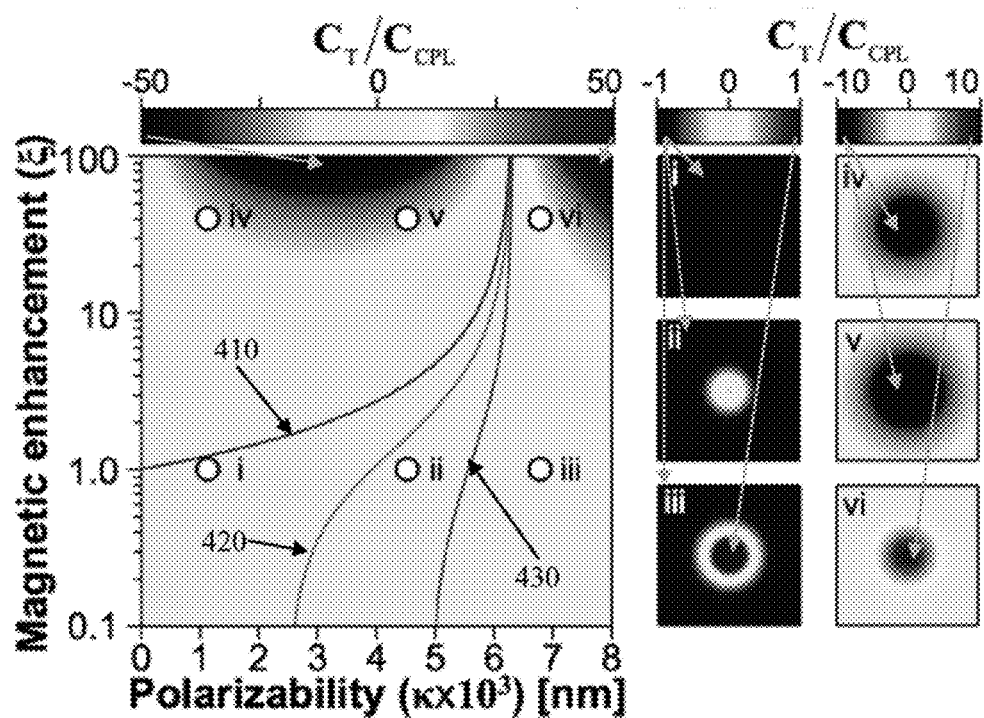
FIG. 4F demonstrates near-field chiral density at $(x, y)=0$ and $z_0=50$ nm produced by a rotating dipole when excited with a backward-propagating LCP incident.

FIGS. 4A-4F, collectively referred to as FIG. 4, show: free space normalized LSP chiral near-field density distribution for LCP (FIG. 4A) and RCP (FIG. 4B) excitations, represented in one array unit cell; simulated absorption spectra of the 2D achiral plasmonic substrate for LCP, LP, and RCP (FIG. 4C); chiral near-field cross section for right RD (FIG. 4D) and left RD (FIG. 4E) with $\kappa=2.8\times10^3$ nm$^2$ and $\xi=20$; and near-field chiral density at $(x,y)=0$ and $z_0=50$ nm produced by the backward propagating LCP (C<0) incident field and the excited dipole field (FIG. 4F). In FIG. 4F, the right panels represent the chiral field in the xy plane at $z_0=50$ nm for $(\kappa\times10^3,\xi)$: i (1.1, 1), ii (4.5, 1), iii (6.7, 1), iv (1.1, 40), v (4.5, 40), vi (6.7, 40).

Both polarizability and magnetic field enhancement have significant effect to the total chiral near-field. Consider Eq. (3) for $(x, y)=0$, $r=z$ and $z>0$ plotted in the left panel of FIG. 4F, and xy planes for $z=z_0$ and representative $(\kappa,\xi)$ plotted in FIG. 4F, right panels.

The condition for $\xi$ that produces zero chiral density is $\xi_{th}=(1-\kappa^{-1}r^2)(1-k^2\kappa)^{-1}$ determining the threshold at which the chiral density flips sign with respect to the incident field [middle line 420 in FIG. 4F and conditions i and ii]. It also determines the nature of the total chiral density. If $\xi>\xi_{th}$, the dipole magnetic field dominates ($C_{ECPL\text{-}BRD}$) observed in condition i compared to ii for $\xi<\xi_{th}$. In addition, if $\xi>(1-k^2\kappa)^{-1}$, the total near-field becomes superchiral [left line 410 in FIG. 4F and conditions iv and v]. On the other hand, if $\xi<\xi_{th}$ the dipole electric field dominates ($C_{ERD\text{-}BCPL}$) reversing the chiral density sign with respect to the incident field with superchiral light generation condition when $\xi<(1-2\kappa^{-1}r^2)(1-k^2\kappa)^{-1}$ [right line 430 in FIG. 4F and conditions iii and vi].

This RD model reveals the true nature of the chiral near-field generated by the dipole-like LSP mode excited in the achiral plasmonic system. As observed in FIG. 3, the m-LSP dominates the resonance on the top hole over the e-LSP mode establishing the condition of weak electric polarizability but large magnetic field enhancement. The spatial chiral density profile (xz for y=0) for such an RD is plotted in FIG. 4E for right RD and left RD, respectively. In this result a centrosymmetric chiral density profile is observed on top of the RD dipole (see FIG. 4F). It is not the LSP field distribution per se that produces single-handed chiral near-fields but its spatiotemporal distribution of the rotating degenerate resonance, which was not the case in a symmetric, yet achiral, configuration. Finally, the effective rotating LSP mode produces twisted Poynting vectors swirling into the hole. As a result, an optical vortex is generated demonstrating the existence of orbital angular momentum. Hence, the local field helicity along with the twisted phase fronts conserve the total incident angular momentum.

Figure 5A:
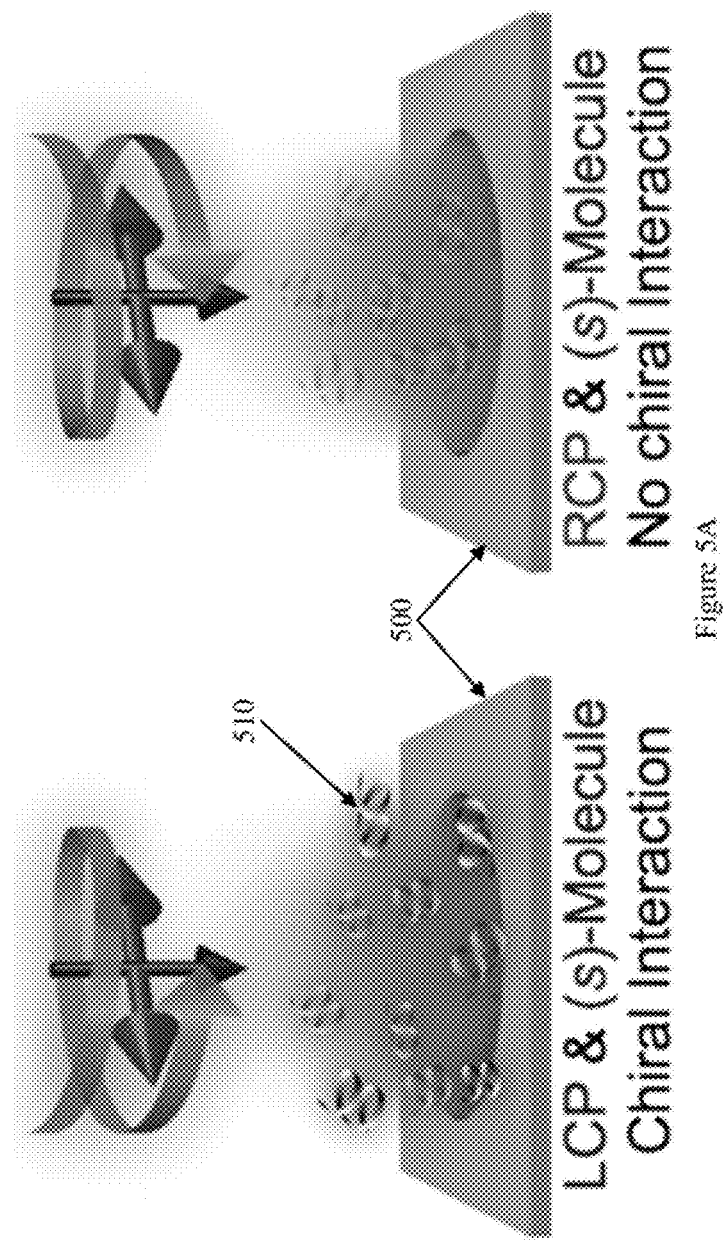
FIG. 5A shows a schematic representation of chiral light-matter interaction between LCP and (s) enantiomer.
Figure 5B:
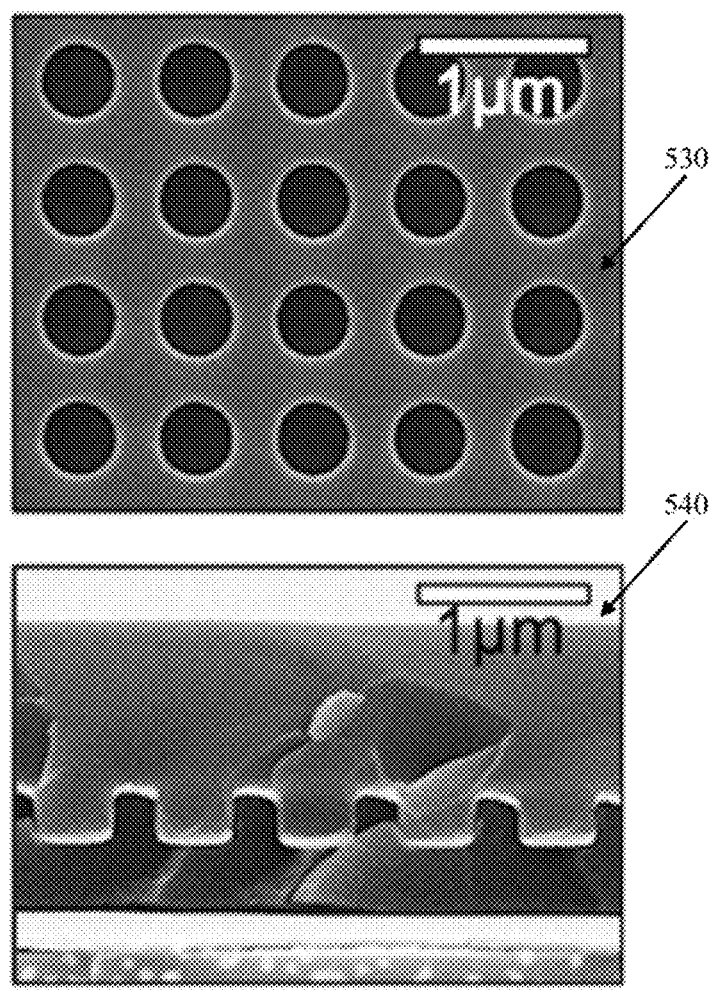
FIG. 5B shows a top view of one uncoated sample and cross section view of one polymer coated substrate embedding the chiral molecule.

The absorption dissymmetry for an arbitrary molecule is determined by both matter and light chirality. While matter chirality is fixed for a particular molecule, it is only the electromagnetic chirality that enhances the scattered far-field CD signal, defined as $g=2(R^{RCP}-R^{LCP})/(R^{RCP}+R^{LCP})$. The system is achiral and hence does not change the overall geometrical chirality (molecule+device). However, it is advantaged from the fact that it is able to exploit both chirality as well as the enhanced superchiral near-field at the hot spots localized around the patterned area, which concomitantly enhances the light-matter interaction. Surface enhanced vibrational chiral dichroism is demonstrated, pictographically represented in FIG. 5A, in the achiral plasmonic substrate 500 tuned the C—H vibrational band of camphor, $v \sim 3000$ cm$^{-1}$. The chiral molecules 510 are embedded in a polymer matrix solution at $\sim 0.614$ M concentration, spun coated onto the substrate to form a thin film with an approximate 3% molecular filling fraction as observed in FIG. 5B. The optical characterization is performed using a microscope-coupled Fourier-transform infrared spectroscopy (FTIR) probing a volume of $\sim 3.8$ nL. The optical configuration is schematically shown in FIG. 5C.

FIGS. 5A-5D, collectively referred to as FIG. 5, show: (FIG. 5A) a schematic representation of chiral light-matter interaction between LCP and (s) enantiomer; (FIG. 5B) a top view 530 of one uncoated sample and cross section view 540 of one polymer coated substrate embedding the chiral molecule; (FIG. 5C) an experimental representation for the optical characterization; and (FIG. 5D) a dissymmetry factor for camphor (from top to bottom) on planar gold mirror, detuned, and tuned achiral plasmonic substrate (also illustrated in the inset of each plot). The vertical line represents the LSPR of the tuned substrate.

Figure 5C:
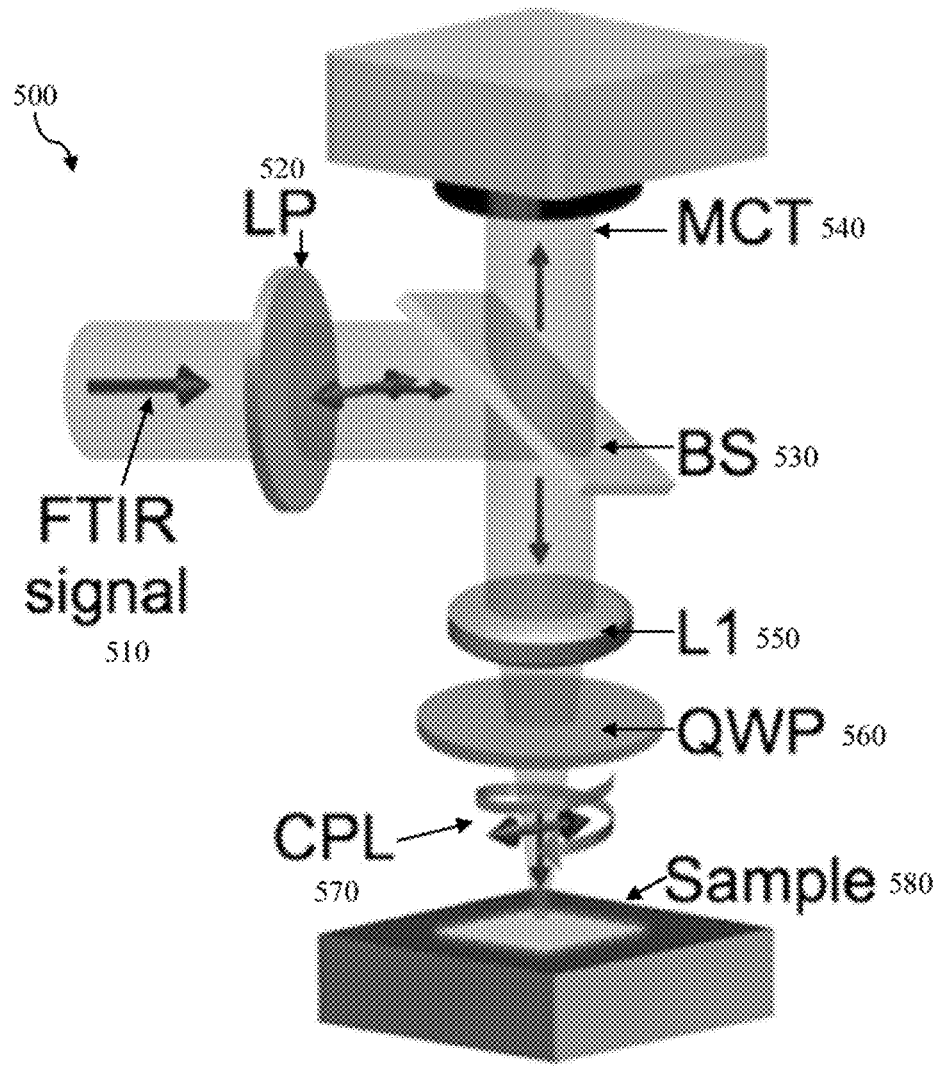
FIG. 5C shows a representation for the optical characterization.

As shown in FIG. 5C, the optical characterization system 500 uses a FTIR signal 510 is linearly polarized 520. The resulting beam is sent through a beam splitter (BS) 530 which transmits part of the beam to the MCT 540 and another part of the beam to a lens (L1) 550. The lens 550 directs the beam to quart wave plate (QWP) 560. The CPL 570 is then directed to the sample 580.

Figure 5D:
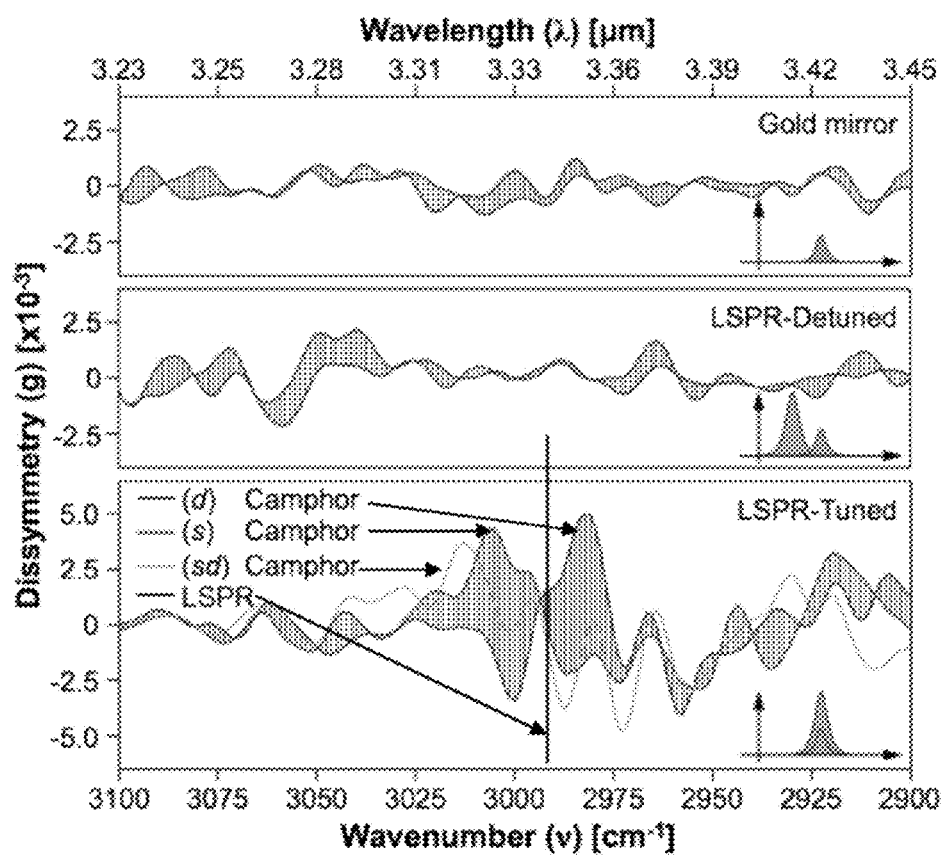
FIG. 5D shows the dissymmetry factor for camphor on planar gold mirror, detuned, and tuned achiral plasmonic substrate.

The dissymmetry in the reflectance (g) for (d) camphor and (s) camphor is shown in FIG. 5D, where $g\sim 5\times 10^{-3}$ is observed around the LSP resonance, represented by the vertical line in FIG. 5D. In contrast, the same films deposited and characterized on a flat gold film and on the same achiral plasmonic substrate detuned from the camphor absorption band do not show dissymmetry in the reflectance spectra; see FIG. 5D. Therefore, it is the chiral near-field generated by the plasmon resonance, which further overlaps with the absorption band of the chiral analyte, that gives rise to a finite VCD signal since it is at resonance where the chiral near-field density is maximum. Conventional VCD spectroscopy of 0.6 M camphor in liquid solvent reveals path length normalized dissymmetry factors (g/μm) in the order of $2\times 10^{-7}$ μm$^{-1}$. In contrast, the demonstration on a similar concentration but much smaller effective path length of $\sim 1$ μm, dissymmetry factors of g $5\times 10^{-3}$ μm$^{-1}$ are observed, with about 4 orders of magnitude enhancement in detection sensitivity (g/μm). The achiral plasmonic structure offers superchiral near-field generation through the magnetic plasmon resonance. This is a limiting factor in the current demonstration since the chiral molecular absorption rate is predominantly defined by electric dipole transitions.

Various embodiments provide a way to generate a single-handed superchiral near-field on achiral plasmonic substrates with simultaneous zero far-field CD. The fundamental physical mechanism is elucidated using a rotating dipole model and demonstrated in surface-enhanced VCD on a single achiral substrate. The concept removes the constraint in surface-enhanced chiroptical spectroscopy requiring both chiral plasmonic enantiomers to perform enantiomeric discrimination. This enables further fundamental and applied research in biosensing, where not only the detection of the target analyte would be possible, but its chiral configuration like real time monitoring of protein folding as well.

As described above, various embodiments provide a method, apparatus and computer program(s) for chirality detection using hybrid plasmonic substrates.

Figure 6:
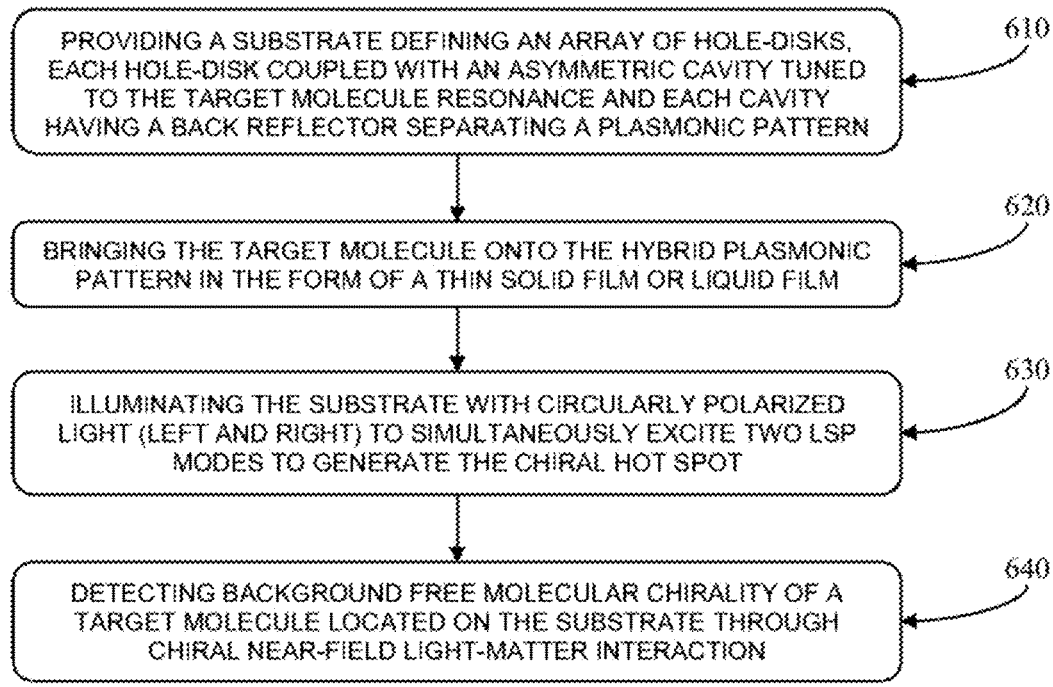
FIG. 6 is a logic flow diagram that illustrates the operation of a method, and a result of execution of computer program instructions embodied on a computer readable memory, in accordance with various embodiments.

FIG. 6 is a logic flow diagram that illustrates a method, and a result of execution of computer program instructions, in accordance with various embodiments. In accordance with an embodiment, a method performs, at Block 610, a step of providing a substrate defining an array of hole-disks. Each hole-disk is coupled with an asymmetric cavity and each cavity has a back reflector separating a plasmonic pattern. The cavity thickness is carefully selected as to overlap the achiral plasmonic resonance to the molecular resonance. The target molecule is brought in contact to the plasmonic substrate, for example, via spin coating or through a flow cell, at Block 620. The substrate is illuminated with circularly polarized light (left and right) to simultaneously excite both LSP modes to generate the chiral hot spot at Block 630. At Block 640, the method also performs a step of detecting background free molecular chirality of the target molecule located on the substrate through near-field light-matter interaction.

The various blocks shown in FIG. 6 may be viewed as method steps, as operations that result from use of computer program code, and/or as one or more logic circuit elements constructed to carry out the associated function(s).

Various operations described are purely exemplary and imply no particular order. Further, the operations can be used in any sequence when appropriate and can be partially used. With the above embodiments in mind, it should be understood that additional embodiments can employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared, and otherwise manipulated.

Any of the operations described that form part of the presently disclosed embodiments may be useful machine operations. Various embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines employing one or more processors coupled to one or more computer readable medium, described below, can be used with computer programs written in accordance with the teachings herein, or it may be more convenient to construct a more specialized apparatus to perform the required operations.

The procedures, processes, and/or modules described herein may be implemented in hardware, software, embodied as a computer-readable medium having program instructions, firmware, or a combination thereof. For example, the functions described herein may be performed by a processor executing program instructions out of a memory or other storage device.

The foregoing description has been directed to particular embodiments. However, other variations and modifications may be made to the described embodiments, with the attainment of some or all of their advantages. Modifications to the above-described systems and methods may be made without departing from the concepts disclosed herein. Accordingly, the invention should not be viewed as limited by the disclosed embodiments. Furthermore, various features of the described embodiments may be used without the corresponding use of other features. Thus, this description should be read as merely illustrative of various principles, and not in limitation of the invention.

What is claimed is:

1. A method, comprising:
providing a substrate defining an array of hole-disks, each hole-disk coupled with an asymmetric optical cavity and each asymmetric optical cavity having a back reflector separating a plasmonic pattern by an appropriate selection of thickness;
illuminating the substrate to simultaneously excite two degenerate localized surface plasmon modes; and
producing a strong chiral near-field.

2. The method of claim 1, wherein the substrate is a nanostructured square array of gold hole-disks and the back reflector comprises at least one of: gold or another high reflective metal.

3. The method of claim 2, further comprising detecting background-free circular dichroism molecular chirality of a sample located on the substrate through near-field light-matter interaction with high signal to noise ratio.

4. An optical chip configured to perform the method of claim 2 in order to detect chirality of one of: drugs, proteins, DNAs, and other molecules.

5. A drug delivery chip configured to perform the method of claim 2 and configured to bring a target chiral sample into contact with the substrate, wherein the substrate is an achiral substrate.

6. The method of claim 1, wherein illuminating the substrate comprises illuminating the substrate with circularly polarized light.

7. The method of claim 6, wherein the substrate is an achiral substrate; and
wherein illuminating the substrate by the circularly polarized light comprises changing a handedness of the circularly polarized light from right and left on the achiral substrate in order to switch a handedness of a chiral near-field between right and left enabling detection of both right and left handed chiral molecules on the achiral substrate.

8. The method of claim 1, wherein the substrate is a plasmonic substrate, and wherein due to achiral symmetry, the plasmonic substrate suppresses the circular dichroism from the substrate, allowing detection of pure chiral signal from a sample molecule on the substrate.

9. A method of claim 1, further comprising generating a characterization of chiral molecules for complex chiral assays, wherein the substrate comprises a thin film of the chiral molecules.

10. The method of claim 9, wherein the complex chiral assays include at least one of: multiple molecules and control measurements.

11. The method of claim 9, wherein the thin film comprises the chiral molecules embedded in a polymer matrix.

12. A chirality detector comprising:
   a substrate;
   a back reflector disposed on the substrate; and
   an array of hole-disks disposed in the substrate, each hole-disk coupled with an asymmetric optical cavity,
   wherein each asymmetric optical cavity is defined by the back reflector separating a plasmonic pattern by a given thickness.

13. The chirality detector of claim 12, wherein the array of hole-disks is a nanostructured square array of hole-disks.

14. The chirality detector of claim 12, wherein the array of hole-disks comprises gold hole-disks, and wherein the back reflector comprises gold.

15. The chirality detector of claim 12, further comprising a thin film of chiral molecules.

16. The chirality detector of claim 15, wherein the thin film comprises the chiral molecules embedded in a polymer matrix.

17. The chirality detector of claim 15, further comprising a sensor configured to detect a pure chiral signal from the chiral molecules.

18. The chirality detector of claim 12, wherein each hole-disk is disposed at approximately an optical center of the coupled asymmetric optical cavity.

19. The chirality detector of claim 12, further comprising a source of circularly polarized light, the source configured to illuminate the array of hole-disks.

20. The chirality detector of claim 19, further comprising optics configured to transform a Fourier-transform infrared spectroscopy signal into the circularly polarized light.

* * * * *